(12) United States Patent
Mitani (10) Patent No.: US 11,812,145 B2
(45) Date of Patent: Nov. 7, 2023

(54) IMAGING DEVICE PROVIDED WITH EVENT-BASED CAMERA

(71) Applicant: DENSO WAVE INCORPORATED, Aichi-Pref. (JP)

(72) Inventor: Yusuke Mitani, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 17/701,832

(22) Filed: Mar. 23, 2022

(65) Prior Publication Data
US 2022/0217281 A1 Jul. 7, 2022

Related U.S. Application Data (63) Continuation of application No. 17/073,998, filed on Oct. 19, 2020, now Pat. No. 11,412,127.

(30) Foreign Application Priority Data

Oct. 17, 2019 (JP) ................................ 2019-190365
Oct. 28, 2019 (JP) ................................ 2019-195350

(51) Int. Cl.
*H04N 23/67* (2023.01)
*G02B 7/09* (2021.01)
(Continued)

(52) U.S. Cl.
CPC ............ *H04N 23/672* (2023.01); *G02B 7/09* (2013.01); *G02B 7/34* (2013.01); *G03B 13/36* (2013.01); *H04N 23/959* (2023.01)

(58) Field of Classification Search
CPC .... H04N 23/672; H04N 23/959; H04N 23/67; G02B 7/09; G02B 7/34; G03B 13/36
See application file for complete search history.

(56) References Cited

U.S. PATENT DOCUMENTS

2011/0317059 A1* 12/2011 Takeuchi ......... H04N 5/232945
348/E5.045
2012/0162493 A1 6/2012 Wakamiya et al.
(Continued)

FOREIGN PATENT DOCUMENTS

CN 109151315 A 1/2019
CN 110213480 A 9/2019
(Continued)

OTHER PUBLICATIONS

Gallego et al.; "Focus Is All You Need: Loss Functions for Event-based Vision;" IEEE/CVF Conference on Computer Vision and Pattern Recognition (CVPR); 2019; pp. 12272-12281.
(Continued)

*Primary Examiner* — Padma Haliyur
(74) *Attorney, Agent, or Firm* — Oliff PLC (57) ABSTRACT

An imaging device in which an autofocus function can be performed without using brightness information is provided. In an imaging device according to one aspect, a density of points obtained by plotting two-dimensional point data of a plurality of event data as points on a plane, the event data outputted from an imaging element in a predetermined period in a state in which a focal point of a light receiving lens is adjusted by an adjustment mechanism, is calculated as a point density. When the point density is calculated, a control unit drives and controls the adjustment mechanism based on comparison results between the point density currently calculated and the point density last calculated to thereby adjust the focal point toward the in-focus position. In another aspect, an imaging device having an autofocus function can be provided without using event data.

3 Claims, 10 Drawing Sheets

(51) Int. Cl.
*G02B 7/34* (2021.01)
*G03B 13/36* (2021.01)
*H04N 23/959* (2023.01)

(56) References Cited

U.S. PATENT DOCUMENTS

| | | |
|---|---|---|
| 2014/0085621 A1 | 3/2014 | Lee et al. |
| 2016/0182812 A1* | 6/2016 | Mine ................ H04N 5/23219 348/222.1 |
| 2016/0227135 A1 | 8/2016 | Matolin et al. |
| 2016/0269615 A1 | 9/2016 | Deng et al. |
| 2017/0366740 A1 | 12/2017 | Nakamaru et al. |
| 2019/0014258 A1 | 1/2019 | Horesh |

FOREIGN PATENT DOCUMENTS

| | | |
|---|---|---|
| WO | 2019135411 A1 | 7/2019 |
| WO | 2020215050 A1 | 10/2020 |

OTHER PUBLICATIONS

U.S. Appl. No. 17/073,998, filed Oct. 19, 2020 in the name of Mitani.

* cited by examiner

IMAGING DEVICE PROVIDED WITH EVENT-BASED CAMERA

CROSS-REFERENCE TO RELATED APPLICATION

This application is a continuation of U.S. patent application Ser. No. 17/073,998 filed Oct. 19, 2020, which is based on and claims priority to Japanese Patent Applications No. 2019-190365 filed Oct. 17, 2019, and No. 2019-195350 filed Oct. 28, 2019, the entire disclosures of each of which are incorporated herein by reference in their entirety.

BACKGROUND

Technical Field

The present invention relates to imaging devices provided with an optical system for optically imaging an object and an imaging element. More specifically, the present invention relates to an imaging device provided with an event-based camera.

Related Art

There has been a known technique of generating optical images of a target object at a higher speed. US-A 2016/0227135 discloses an event-based camera as an example of such a technique. The event-based cameras, which are cameras inspired by a biological retinal structure, are configured to sense brightness changes in pixel-level and output the coordinates of the pixel, time, and polarity of the brightness changes.

Unlike the conventional cameras, the event-based cameras do not output pixel information which does not involve brightness changes, that is, redundant data. Accordingly, due to a reduced volume of data communication and lightweight image processing, images of a target object can be generated at a higher speed.

PRIOR ART REFERENCE

Patent Reference

[Patent Reference 1] US-A 2016/0227135

Usually, normal optical cameras obtain image data with brightness information in each pixel. Accordingly, most cameras have an autofocus function, which uses brightness information, as a standard function. On the other hand, event-based cameras, which obtain event data in response to brightness changes, cannot obtain brightness information itself. For this reason, event-based cameras cannot have an autofocus function that uses brightness information. Accordingly, when an image of a target object taken by an event-based camera is out of focus and blurred, light on the target object is dispersed, and the accurate event data cannot be obtained.

SUMMARY

A first object of the present invention is to provide an autofocus function to an imaging device provided with an event-based camera, and a first practical object of the present invention is to provide the autofocus function to such an imaging device without using brightness information.

A second practical object of the present invention is to provide the autofocus function to such an imaging device without using event data outputted from an imaging element thereof.

In order to achieve the above first practical object, an imaging device (10) according to one exemplary configuration includes:

an imaging element (21) that outputs event data including two-dimensional point data corresponding to pixels whose brightness has changed when receiving light via a light receiving lens (22) for specifying positions of the pixels;

an adjustment mechanism (23) that adjusts a focal point of the light receiving lens;

a control unit (11) that drives and controls the adjustment mechanism; and a point density calculation unit (11) that calculates a point density, which is a density of points obtained by plotting the two-dimensional point data of a plurality of the event data as points on a predetermined plane, the event data being outputted from the imaging element in a predetermined period in a state in which the focal point of the light receiving lens is adjusted by the adjustment mechanism, wherein the control unit drives and controls the adjustment mechanism to adjust the focal point toward an in-focus position based on a comparison result between the point density currently calculated by the point density calculation unit and the point density previously calculated.

With this configuration, the point density calculation unit calculates a point density, which is a density of points obtained by plotting the two-dimensional point data of a plurality of the event data as points on a predetermined plane, the event data being outputted from the imaging element in a predetermined period in a state in which the focal point of the light receiving lens is adjusted by the adjustment mechanism. Then, the control unit drives and controls the adjustment mechanism to adjust the focal point toward the in-focus position based on a comparison result between the point density currently calculated by the point density calculation unit and the point density previously calculated. With this configuration and operations, the imaging device provided with the event-based camera is able to have an autofocus function.

When the two-dimensional point data of a plurality of event data outputted from the imaging element in a predetermined period in a state in which the target object is out of focus (focal point is out of focus) are plotted as points on a predetermined plane, the point data tend to be dispersed due to the blurred edge of the target object. On the other hand, when the two-dimensional point data of a plurality of event data outputted from the imaging element in a predetermined period in a state in which the target object is in focus (focal point is in focus) are plotted as points on a predetermined plane, the point density of the point data increases due to the sharp edge of the target object. That is, the smaller the focus shift, the higher the point density of the two-dimensional point data.

Accordingly, when the comparison result shows that the point density currently calculated is higher than the point density previously calculated, it is determined that the focal point is being adjusted in a direction toward the in-focus position, and the adjustment mechanism is driven and controlled to maintain the adjustment direction. On the other hand, when the comparison result shows that the point density currently calculated is lower than the point density previously calculated, it is determined that the focal point is being adjusted in a direction away from the in-focus position, and the adjustment mechanism is driven and controlled to switch the adjustment direction to the opposite direction. Since the focal point can be adjusted by using the event data, an autofocus function can be performed without using brightness information.

Further, for example, in the above configuration, the control unit may drive and control the adjustment mechanism only when a difference between the point density currently calculated by the point density calculation unit and the point density previously calculated is larger than or equal to a predetermined value. With this configuration, when a difference between the point density currently calculated and the point density previously calculated is less than the predetermined value, that is, when the target object is substantially in focus, the adjustment mechanism is not driven, which eliminates unnecessary adjustment of the focal point.

In order to achieve the above second practical object, an imaging device (10A) according to another exemplary configuration includes:

- an imaging element (21) that outputs event data including two-dimensional point data corresponding to pixels having a change in brightness of a predetermined value or more when receiving light via a light receiving lens (22) for specifying positions of the pixels;
- an adjustment mechanism (23) that adjusts a focal point of the light receiving lens;
- a control unit (11) that drives and controls the adjustment mechanism;
- a shift amount detection unit (25) that detects a shift amount from an in-focus position of the light receiving lens in a phase difference AF (autofocus) method when receiving light via the light receiving lens; and
- a beam splitter (24) that splits a beam of light traveling from the light receiving lens toward the imaging element to thereby allow part of the beam of light to be directed to the shift amount detection unit, wherein
- the control unit drives and controls the adjustment mechanism to adjust the focal point toward the in-focus position based on the shift amount detected by the shift amount detection unit.

With this configuration, the imaging device, which includes an imaging element that outputs event data including two-dimensional point data corresponding to pixels having a change in brightness of a predetermined value or more when receiving light via the light receiving lens for specifying positions of the pixels, is adopted. Further, the beam splitter splits a beam of light traveling from the light receiving lens toward the imaging element, and the shift amount detection unit, when receiving the light thus split, detects a shift amount from the in-focus position of the light receiving lens in a phase difference AF method when receiving light. The adjustment mechanism is driven and controlled by the control unit based on the detected shift amount so that the focal point of the light receiving lens is adjusted toward the in-focus position. With this configuration and operations, the imaging device provided with the event-based camera is also able to have the autofocus function.

Since the focal point can be adjusted by detecting the shift amount from the in-focus position of the light receiving lens by using the light split by the beam splitter, an autofocus function can be performed without using brightness information.

The reference signs in parenthesis indicate the corresponding relationship with the specific elements in the embodiments described below.

DETAILED DESCRIPTION OF THE PREFERRED EMBODIMENTS

Various embodiments of the present embodiment will now be described with reference to the accompanying drawings.

First Embodiment

With reference to FIGS. 1 to 6, a first embodiment of an imaging device of the present invention will now be described.

An imaging device 10 according to the present embodiment is an imaging device that functions as an event-based camera. The imaging device 10 is configured to output event data. The event data include point data, time and polarities (plus, minus) of the change in brightness, in which the point data are provided to positionally correspond to specified pixels of a two-dimensional image to optically be imaged. In addition, this imaging device 10 is configured to generate two-dimensional point data by plotting, as points, a plurality of event data outputted during a specified period of time on a prepared plane SH (a predetermined plane), and generate, based on the two-dimensional point data, image data imaging an object being targeted. The predetermined plane SH is a two-dimensional plane which is preserved by calculation in the memory area of a storage unit 12 later described, and an image plane when being imaged on a display unit 13 (refer to FIG. 2).

Figure 1:
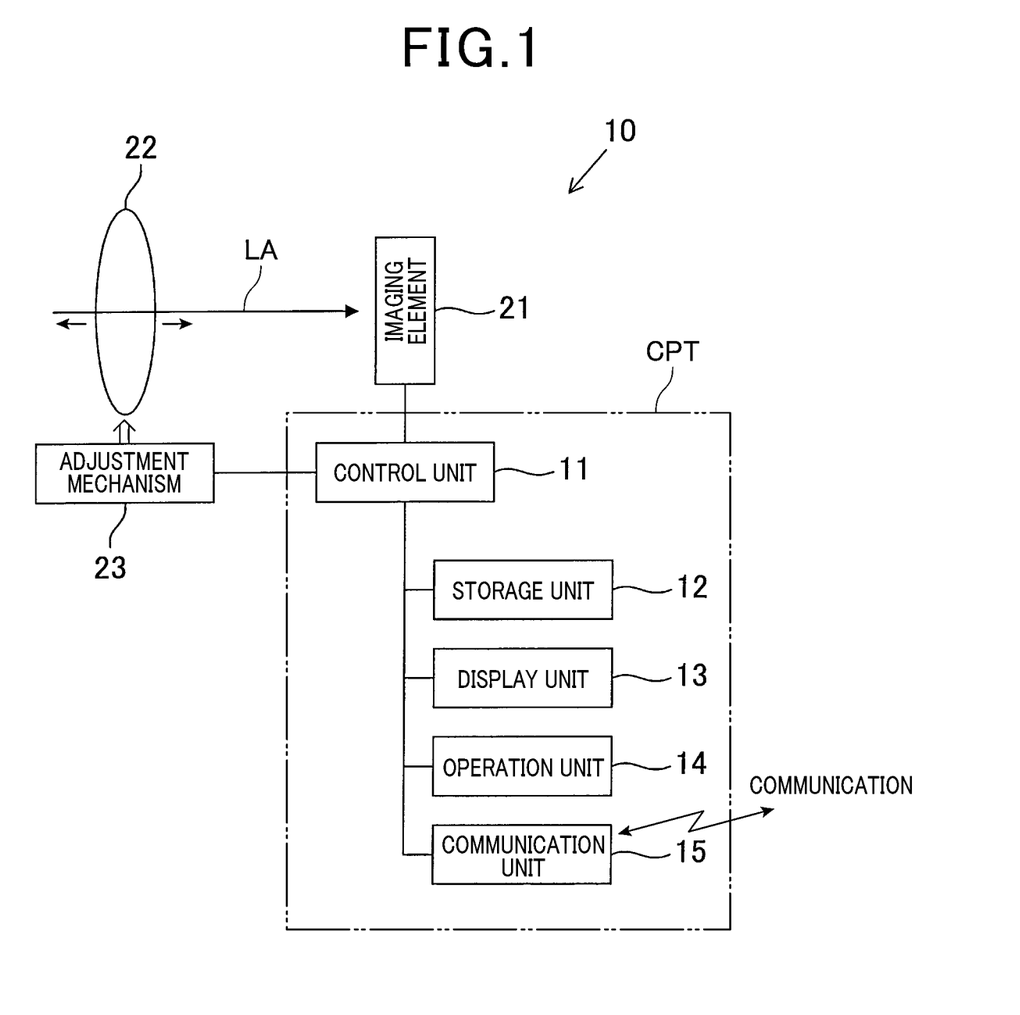
FIG. 1 is a block diagram of a schematic configuration of an imaging device according to a first embodiment.

As shown in FIG. 1, the imaging device 10 includes a control unit 11 provided with a processor such as CPU (central processing unit), and a storage unit 12 provided with, by way of example, semiconductor memories referred as RAM (random access memory), ROM (read-only memory), and main memory. In addition, the imaging device 10 includes a display unit 13 whose display content is controlled by the control unit 11, an operation unit 14 for outputting an operation signal to the control unit 11 in response to an input operation, and a communication unit 15 that communicates with external devices.

These elements 11 to 15 are provided, by way of example, as computer CPT, in which the processor reads various program into its main memory from the ROM in which the programs are previously installed, and executes steps of the read programs in series and, by way of example, repeatedly at intervals, so that the processor provides various desired functions. Such programs include a program for adjusting a focal point, which will be detailed later.

Further, the imaging device 10 includes an imaging unit which includes an imaging element 21, a light receiving lens 22 which is composed of, by way of example, an optical lens, an adjustment mechanism 23 and the like. The imaging element 21 is configured to output event data to the control unit 11. The event data include point data positionally corresponding to each of one or more pixels whose brightness has changed when receiving light via the light receiving lens 22 for specifying positions of the pixels. That is, the imaging element 21 outputs the event data positionally corresponding to pixels whose brightness has changed (two-dimensional point data, time, and polarity of the change in brightness) to the control unit 11, and does not output point data for pixels whose brightness remains unchanged.

By the way, in the present embodiment, when point data whose pixel positions are specified are plotted on a prepared plane SH (refer to FIG. 2), the plotted point data have a distribution (aggregation). Hence, such a point data distribution is referred to as a two-dimensional point data. This plane SH has lateral and longitudinal axes which represent two-dimensional positions of the pixels of an area imaged by the imaging element 21.

The adjustment mechanism 23, which is a known mechanism for adjusting a focal point of the light receiving lens 22, is driven and controlled by the control unit 11 to mechanically move the light receiving lens 22 in either direction along an optical axis LA (adjustment direction) to thereby adjust the focal point of the light receiving lens 22.

In the imaging device 10 having the above configuration, the control unit 11 (practically, the processor with a CPU) performs a focal point adjustment procedure in which the focal point of the light receiving lens 22 is automatically adjusted toward an in-focus position by using the event data outputted from the imaging element 21.

Figure 2:
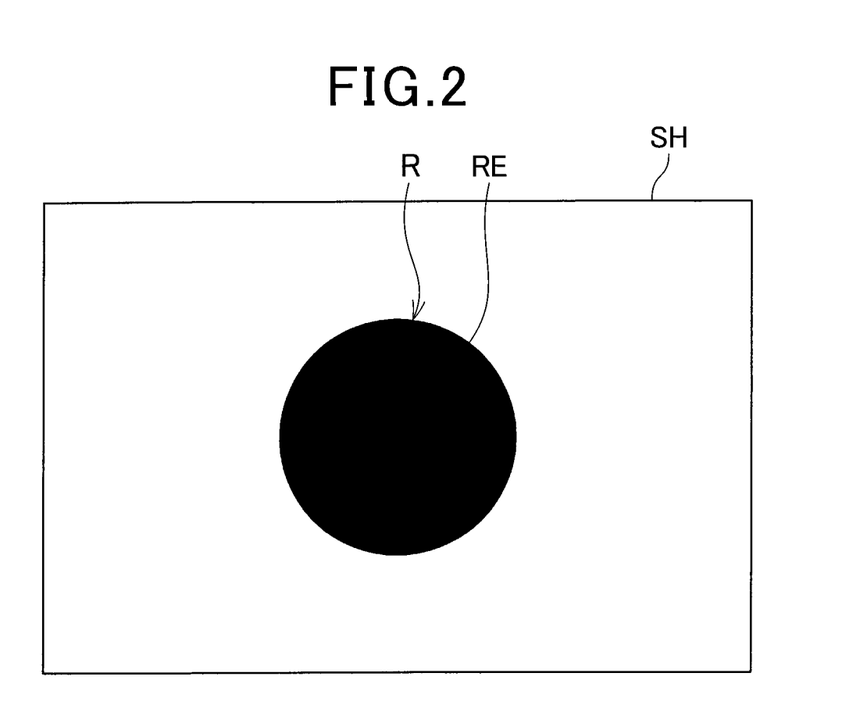
FIG. 2 is a view illustrating a shape of a measurement object.
Figure 3A:
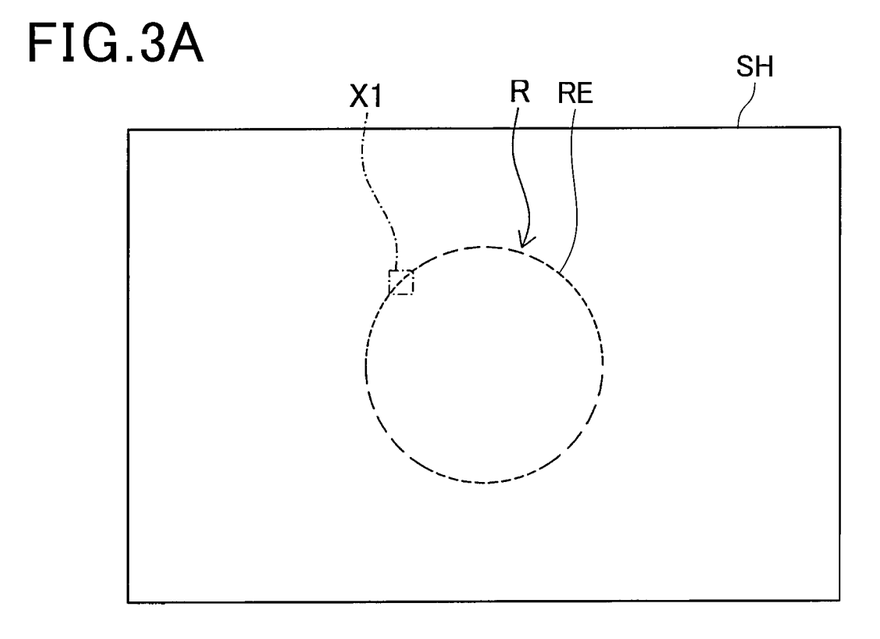
FIG. 3A is a diagram showing a plot of two-dimensional point data obtained by imaging a measurement object shown in FIG. 2, which is substantially in focus, while moving the measurement object toward the imaging device.
Figure 3B:
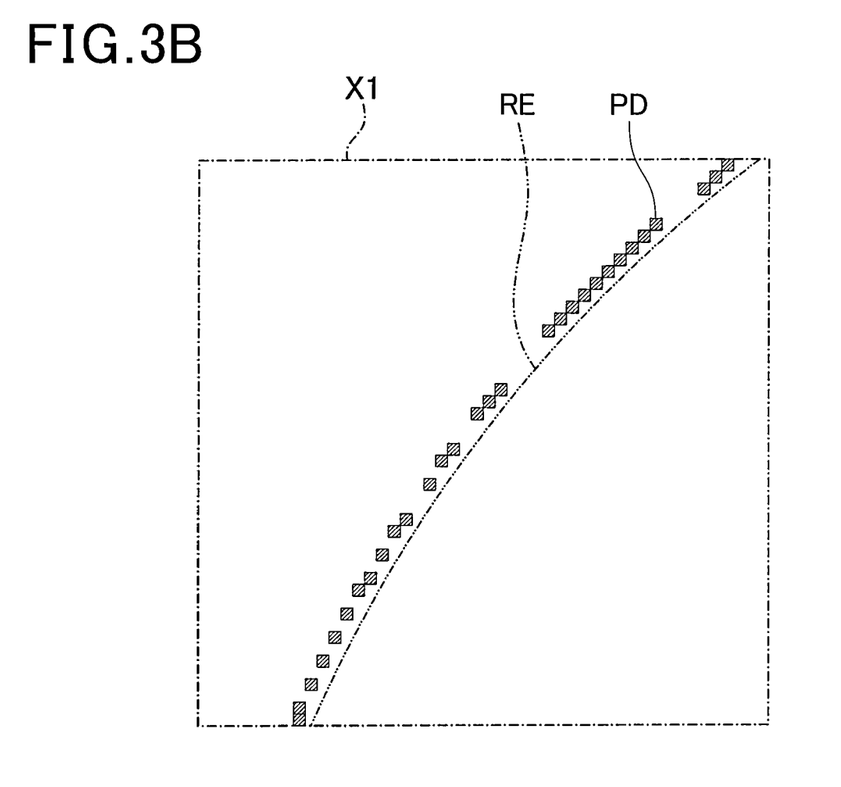
FIG. 3B is an enlarged view of an X1 portion of FIG. 3A.
Figure 4A:
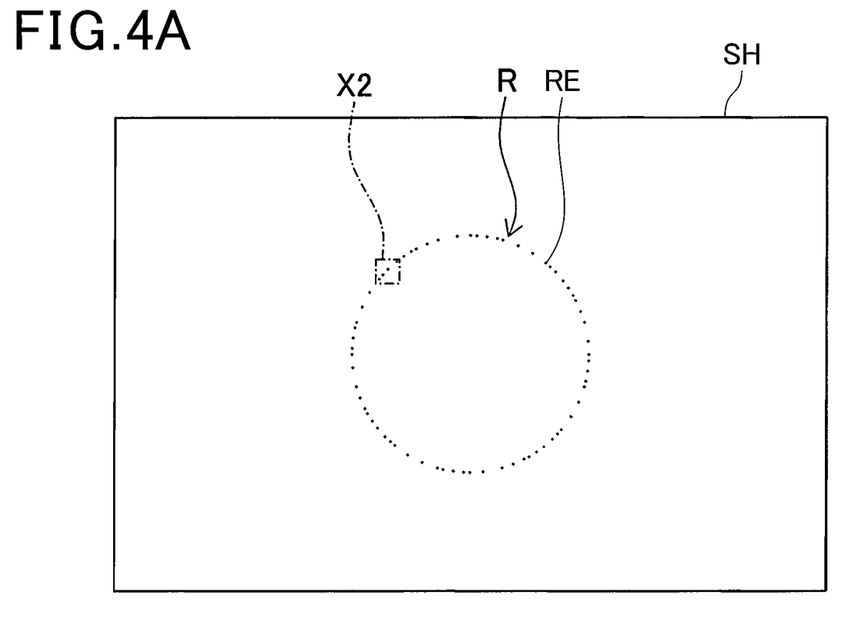
FIG. 4A is a diagram showing a plot of two-dimensional point data obtained by imaging a measurement object shown in FIG. 2, which is out of focus, while moving the measurement object toward the imaging device.
Figure 4B:
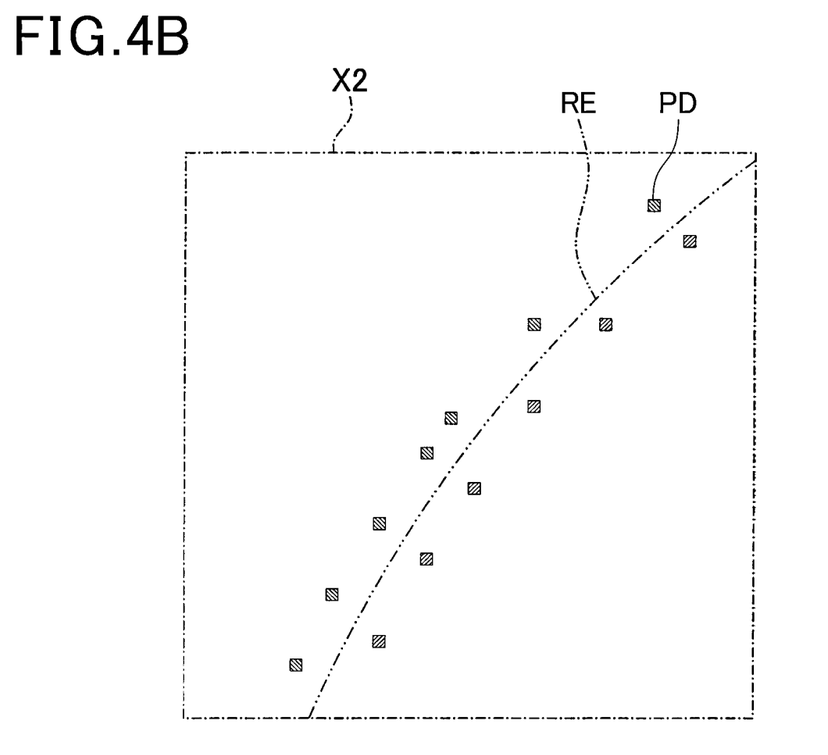
FIG. 4B is an enlarged view of an X2 portion of FIG. 4A.

The focal point adjustment procedure performed by the control unit 11 will be specifically described below with reference to the drawings. FIG. 2 is a view illustrating a shape of a measurement object R. FIG. 3A is a diagram showing a plot of two-dimensional point data obtained by imaging the measurement object R shown in FIG. 2, which is substantially in focus, while moving the measurement object R toward the imaging device 10; and FIG. 3B is an enlarged view of an X1 portion corresponding to one block (i.e., one area provided by two-dimensionally sectioning the predetermined plane SH) in FIG. 3A. FIG. 4A is a diagram showing a plot of two-dimensional point data obtained by imaging the measurement object R shown in FIG. 2, which is out of focus, while moving the measurement object R toward the imaging device 10; and FIG. 4B is an enlarged view of an X2 portion corresponding to one block in FIG. 4A.

Since the event data outputted from the imaging element 21 to the control unit 11 do not include brightness information, autofocus using brightness information cannot be performed. According to the present embodiment, in the focal point adjustment procedure performed by the control unit 11, the point data PD of the plurality of event data outputted from the imaging element 21 in a predetermined period of time are plotted as points on a predetermined plane SH, and a density of these points of such two-dimensional point data is calculated as a point density. Then, the focal point of the light receiving lens 22 is shifted in a direction by which the point density increases.

Incidentally, the imaging element 21 generates event data by applying a threshold process to the respective point data.

The control unit 11 that performs calculation of the above point density can correspond to an example of a "point density calculation unit."

Specifically, for example, the above predetermined plane SH is divided into a predetermined number of two-dimensional blocks. Then, for the blocks including a predetermined number or more of event data, an average nearest neighbor distance W of the two-dimensional point data (that is, two-dimensionally plotted point data PD (in the present embodiment, the reference symbol PD is used which is the same as the single point data PD) in each block is calculated according to the following formula (1) using a nearest neighbor method, and the average nearest neighbor distance W is obtained as information indicating a point density. Then, the focal point of the light receiving lens 22 is shifted in a direction by which the point density increases.

$$W = \frac{1}{n}\sum_{i=1}^{n} di, \qquad (1)$$

wherein di denotes the nearest neighbor distance for point I; and n denotes the number of points The reason for adjusting the focal point of the light receiving lens 22 in a direction by which the point density increases as described above will now be described.

When the point data PD of a plurality of event data outputted from the imaging element 21 in a predetermined period of time in a state in which the measurement object is out of focus (focal point does not coincide with the in-focus position) are plotted as points on a predetermined plane SH, the two-dimensional point data PD tend to be dispersed due to the blurred edge of the measurement object R. On the other hand, when the point data PD of a plurality of event data outputted from the imaging element 21 in a predetermined period in a state in which the measurement object is in focus (focal point coincides with the in-focus position) are plotted as points on a predetermined plane SH, the point density of the two-dimensional point data PD increases due to the sharp edge of the measurement object R.

For example, as shown in FIG. 2, it is assumed that a black circular measurement object R moving toward the imaging device 10 in a white background is imaged while adjusting the focal point by moving the light receiving lens 22. In this case, since the black circle gradually increases in the white background when imaged, two-dimensional point data PD are obtained with a change to negative (hereinafter, a negative change) in brightness at the edge of the measurement object R. In other words, when a pixel shows a change from white to black, there is a case in which there have occurred a negative change in the brightness (i.e., optical signal intensities received by the imaging device), thus providing pixel by pixel event data whose polarities of the brightness have changed to the negative.

When the measurement object R is substantially in focus, the edge of the measurement object R becomes sharp. Accordingly, as shown in FIGS. 3A and 3B, the two-dimensional point data PD are present along the line RE corresponding to the actual edge of the measurement object R (dot-dot-dashed line in FIG. 3B) with relatively high point density. On the other hand, when the measurement object R is out of focus, the edge of the measurement object R becomes blurry. Accordingly, as shown in FIGS. 4A and 4B, the two-dimensional point data PD are deviated from the line RE corresponding to the actual edge of the measurement object R (dot-dot-dashed line in FIG. 4B) with relatively low point density. That is, as seen from FIGS. 3A, 3B, 4A and 4B, the smaller the deviation in focus, the higher the point density of the two-dimensional point data PD.

Further, even when the measurement object is not moved, the light receiving lens 22 may be moved to adjust the focal point. In this case, since the brightness changes at a position corresponding to the edge of the measurement object, the event data are outputted in response to the change in brightness. For example, when a white measurement object is imaged in a black background, as shown in FIGS. 5(A) to 5(E), a plurality of two-dimensional point data PD indicating negative change in brightness (see the black square in FIG. 5) and a plurality of two-dimensional point data PD indicating a change to positive (hereinafter a positive change) in brightness (see the white square in FIG. 5) are obtained near the edge of the measurement object at the boundary between the measurement object and the background (see reference sign RE in FIG. 5).

In other words, when a pixel indicates a change from black to white, there is a case in which there have occurred a positive change in the brightness (i.e., optical signal intensities received by the imaging device), thus providing pixel by pixel event data whose polarities of the brightness have changed to the positive.

When the measurement object is largely out of focus, the edge of the measurement object is blurred and appears as a visually gray area having a certain width in the two-dimensional point data, in which the blur is caused in an area including black point data PD and while point data PD. Accordingly, as shown in FIG. 5(A), a set of two-dimensional point data PD indicating negative change in brightness are provided in a portion of the gray area in contact with the black area, while a set of two-dimensional point data PD indicating positive change in brightness are provided in a portion of the gray area in contact with the white area.

As the focal point is shifted toward the in-focus position, the width of the gray area decreases. Accordingly, as shown in FIG. 5(B), a set (or distribution or group) of two-dimensional point data PD indicating negative change in brightness and a set (or distribution or group) of two-dimensional point data PD indicating positive change in brightness, which approach each other, are obtained.

Figure 5:
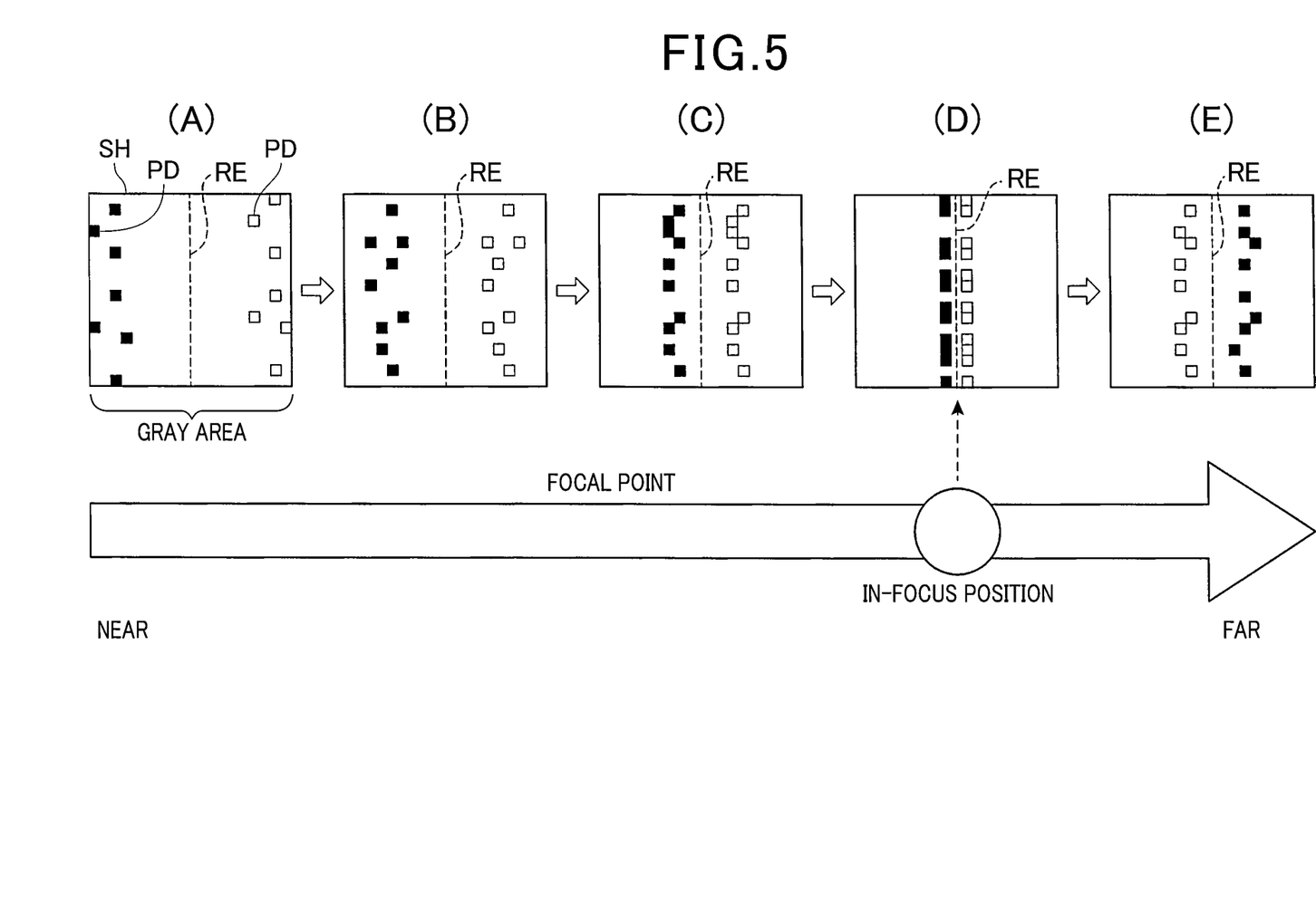
FIG. 5 is a diagram showing a plot of part of two-dimensional point data that are outputted while adjusting a focal point without moving a measurement object.

As the focal point is further shifted toward the in-focus position focal point, as shown in FIG. 5(C), a set of two-dimensional point data indicating negative change in brightness and a set of two-dimensional point data indicating positive change in brightness, further approaching each other, are obtained. When the focal point substantially coincides with the in-focus position, as shown in FIG. 5(D), a set of two-dimensional point data indicating negative change in brightness and a set of two-dimensional point data indicating positive change in brightness, which are located on the actual edge of the measurement object, are obtained. When the focal point is shifted beyond the in-focus position, as shown in FIG. 5(E), a set of two-dimensional point data PD indicating negative change in brightness and a set of two-dimensional point data PD indicating positive change in brightness, which are switched in position, are obtained.

As described above, even when the measurement object is not moved, the point density of two-dimensional point data PD becomes high when the focal point substantially coincides with the in-focus position (see FIG. 5(D)), and the point density of two-dimensional point data PD decreases as the focal point moves away from the in-focus position.

According to the present embodiment, in the focal point adjustment procedure in which the adjustment mechanism 23 is driven and controlled by the control unit 11 to mechanically move the light receiving lens 22 along the optical axis LA to adjust the focal point, the adjustment direction of the light receiving lens 22 is controlled based on the calculated point density of the two-dimensional point data PD. Specifically, when the point density currently calculated is higher than the point density previously calculated, it is determined that the focal point is being shifted toward the in-focus position, and the adjustment direction is maintained. On the other hand, when the point density currently calculated is lower than the point density previously calculated, it is determined that the focal point is being shifted away from the in-focus position, and the adjustment direction is switched to the opposite direction.

Referring to a flowchart shown in FIG. 6, the focal point adjustment procedure performed by the control unit 11 will be described in detail below.

When the focal point adjustment procedure is started by the control unit 11, which drives and controls the adjustment mechanism 23, the light receiving lens 22 is started to move mechanically in a predetermined direction (for example, one side in the adjustment directions along the optical axis LA) for adjustment of the focal point (step S101). Then, at step S103, a plot data generation step is performed. In this step, two-dimensional point data PD of a plurality of event data outputted from the imaging element 21 in a predetermined period (for example, 100 µs) are plotted as points on a prepared plane SH to which data is mapped in the memory.

Then, at step S105, a point density calculation step is performed. In this step, an average nearest neighbor distance W calculated for the points plotted as described above in each block is obtained as a point density.

Subsequently, at step S107, a determination step is performed. In this step, it is determined whether the point density currently calculated is higher than the point density which is last calculated, and stored in the storage unit 12 as described later. In the determination step, comparison is not limited to one between the point density currently calculated and the point density last calculated. The point density currently calculated may also be compared with, for example, the point density calculated two times before. That is, in the determination step, the point density currently calculated is compared with the point density previously calculated.

When the point density currently calculated is higher than the point density last calculated (Yes in step S107), it is determined that the focal point is being shifted toward the in-focus position as described above, and the adjustment mechanism 23 is driven and controlled to maintain the movement direction of the light receiving lens 22 (step S109). After the point density currently calculated is stored in the storage unit 12 as the latest point density (step S113), the steps from step S103 onward are performed.

On the other hand, when the point density currently calculated is lower than the point density last calculated (No in step S107), it is determined that the focal point is being shifted away from the in-focus position as described above, and the movement direction of the light receiving lens 22 is switched to the opposite direction (from one side to the other in the adjustment direction) (step S111). After the point density currently calculated is stored in the storage unit 12 as the latest point density (step S113), the steps from step S103 onward are performed.

Figure 6:
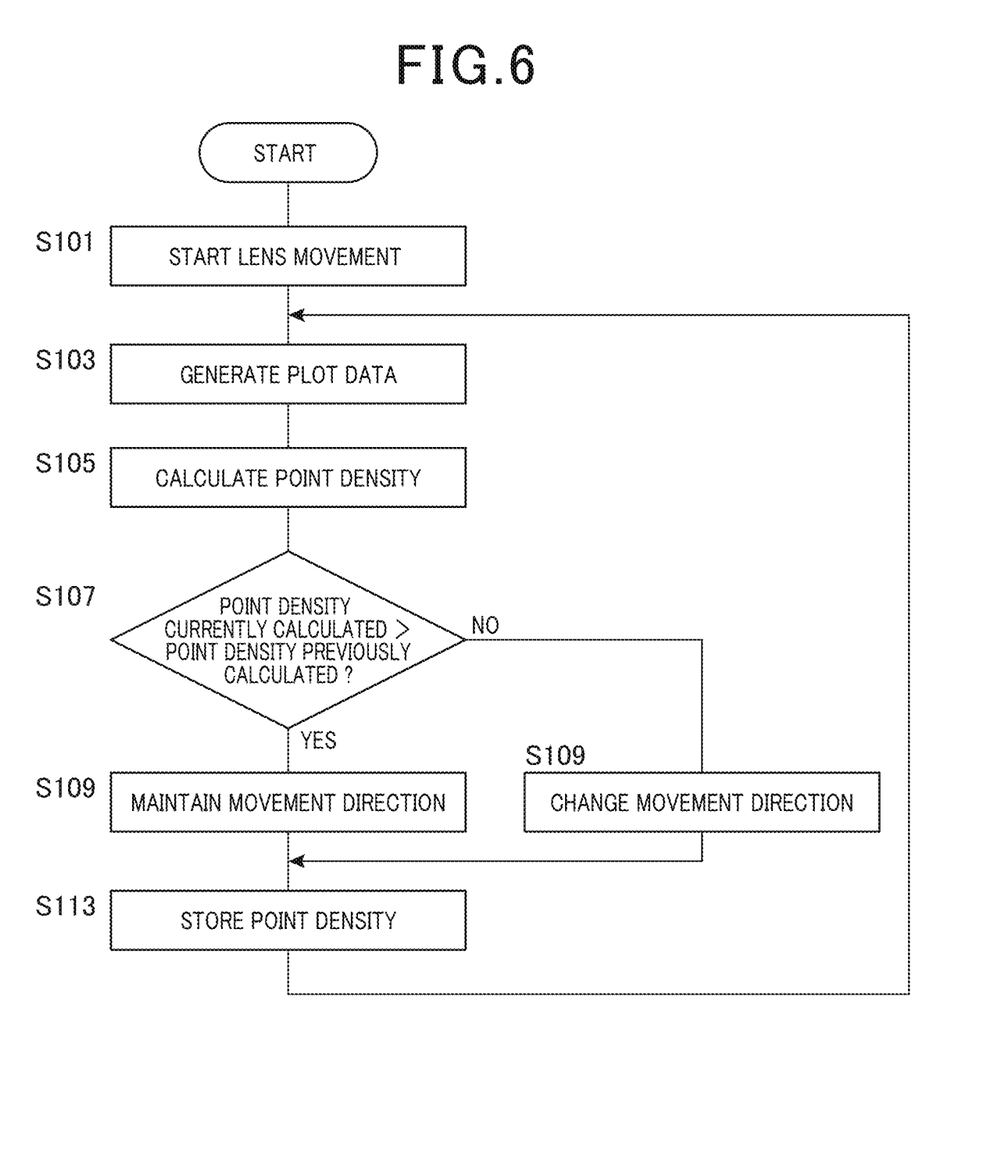
FIG. 6 is a flowchart illustrating a flow of a focal point adjustment procedure performed by a control unit of an imaging device.

The processing shown in FIG. 6 is repeated at given intervals, for example, with the process being returned to step S103.

As the focal point is shifted in a direction by which the point density increases, the focal point comes to substantially coincide with in-focus position, at which the position of the light receiving lens 22 becomes stable. More specifically, in a state in which the focal point substantially coincides with the in-focus position, the light receiving lens 22 moves slightly in either of the directions along the optical axis LA.

As described above, according to the imaging device 10 of the first embodiment, the focal point adjustment procedure is performed by the control unit 11. In this procedure, in a state in which the focal point of the light receiving lens is adjusted by the adjustment mechanism, two-dimensional point data PD of a plurality of event data outputted from the imaging element 21 in a predetermined period are plotted as points on a predetermined plane, and a density of the points is calculated as a point density. Then, the adjustment mechanism 23 is driven and controlled by the control unit 11 to adjust the focal point toward the in-focus position based on a comparison result between the point density currently calculated and the point density which is last calculated.

That is, when the comparison result shows that the point density currently calculated is higher than the point density last calculated, it is determined that the focal point is being shifted toward the in-focus position, and the adjustment mechanism 23 is driven and controlled to maintain the adjustment direction. On the other hand, when the comparison result shows that the point density currently calculated is lower than the point density last calculated, it is determined that the focal point is being shifted away from the in-focus position, and the adjustment mechanism 23 is driven and controlled to switch the adjustment direction to the opposite direction. Since the focal point can be adjusted by using the event data, an autofocus function (AF) can be performed without using brightness information. Hence, it is possible to provide the autofocusing function to the imaging device provided with the event-based camera.

In particular, since the focal point is adjusted by using the event data, there is no need to provide an additional optical system or the like for focal point adjustment. Accordingly, the imaging device 10 that can perform an autofocus function can be reduced in size. Further, compared with the contrast AF by conventional cameras, the volume of pixel data to be processed can be small. Accordingly, data transfer time can be shortened, and thus the processing can be performed at a higher speed. In addition, it is not necessary to perform brightness conversion nor to obtain brightness information for autofocus. Accordingly, driving and controlling of the adjustment mechanism 23 required for autofocus can be performed at a higher speed. Thus, such an autofocus on a moving measurement object has an advantage over the contrast AF by conventional cameras. Since an event camera obtains information only at and near the edge of the moving measurement object, the volume of processed data is small. Due to high frame rate at which the event data are outputted in microsecond units, the time required from detection of movement of the measurement object to autofocus can be reduced.

Furthermore, in the present embodiment, the above predetermined plane is divided into a predetermined number of blocks, and, for the blocks including a predetermined number or more of event data, an average of the point density in each block is calculated as information showing a point density. Since the value of point density is calculated for the blocks including a predetermined number or more of event data, processing load can be reduced compared with the case where the value of point density is calculated for all the blocks. In addition, blocks that contain only noise can be excluded from calculation. As a result, the point density can be calculated in an appropriate manner, improving the adjustment accuracy.

The present invention is not limited to the above first embodiment, and may also be embodied as described below.

(1) In the focal point adjustment procedure performed by the control unit 11, the two-dimensional point data of a plurality of event data outputted from the imaging element 21 in a predetermined period are plotted as points on a predetermined plane before calculation of the point density for convenience of description, but the invention is not limited thereto. The two-dimensional point data may not be necessarily plotted, and the point density can be directly calculated from the two-dimensional point data. Further, the number of event data outputted from the imaging element 21 in a predetermined period may be counted by the control unit 11 that functions as a counting unit, and the point density may be calculated when the number thus counted is larger than or equal to a predetermined value. With this configuration, when the number of event data is less than the predetermined value, that is, when noise is detected while the measurement target is not present, the point density is not calculated. Accordingly, the adjustment mechanism 23 is not driven when it is unnecessary, which eliminates unnecessary adjustment of the focal point.

(2) In the focal point adjustment procedure performed by the control unit 11, the point density is calculated by using a nearest neighbor method, but the invention is not limited thereto. Other calculation methods such as K-function and kernel methods can also be used to calculate the point density. Further, in the focal point adjustment procedure performed by the control unit 11, an average of the point density in each blocks is calculated as information indicating the point density, but the invention is not limited thereto. The point density may also be calculated from all the two-dimensional point data of event data outputted from the imaging element 21 in a predetermined period by using a nearest neighbor method or the like.

(3) In the focal point adjustment procedure performed by the control unit 11, steps from step S109 onward may be performed when a difference between the point density currently calculated and the point density last calculated is larger than or equal to a predetermined value, and thus it is determined as Yes in the determination step at step S107. That is, the adjustment mechanism 23 may be driven and controlled only when a difference between the point density currently calculated in the point density calculation procedure and the point density previously calculated is larger than or equal to the predetermined value. With this configuration, when a difference between the point density currently calculated and the point density previously calculated is less than the predetermined value, that is, when the measurement object is substantially in focus, the adjustment mechanism 23 is not driven, which eliminates unnecessary adjustment of the focal point.

(4) In the point density calculation step of the focal point adjustment procedure, a density of the points obtained by plotting either the two-dimensional point data of the event data indicating positive change in brightness or the two-dimensional point data of the event data indicating negative change in brightness as points on a predetermined plane may be calculated as a point density. For example, when the number of outputted two-dimensional point data indicating positive change in brightness is larger than the number of outputted two-dimensional point data indicating negative change in brightness, a density of points obtained by plotting the two-dimensional point data indicating positive change in brightness as points on the predetermined plane may be calculated as a point density, without taking into consideration the two-dimensional point data indicating negative change in brightness. The two-dimensional point data indicating positive change in brightness and the two-dimensional point data indicating negative change in brightness tend to be clustered separately when the target object is in focus. Accordingly, the adjustment accuracy can be improved by distinguishing the two-dimensional point data indicating positive change in brightness from the two-dimensional point data indicating negative change in brightness, and calculating the point density for either of these two-dimensional point data.

Second Embodiment

Figure 7:
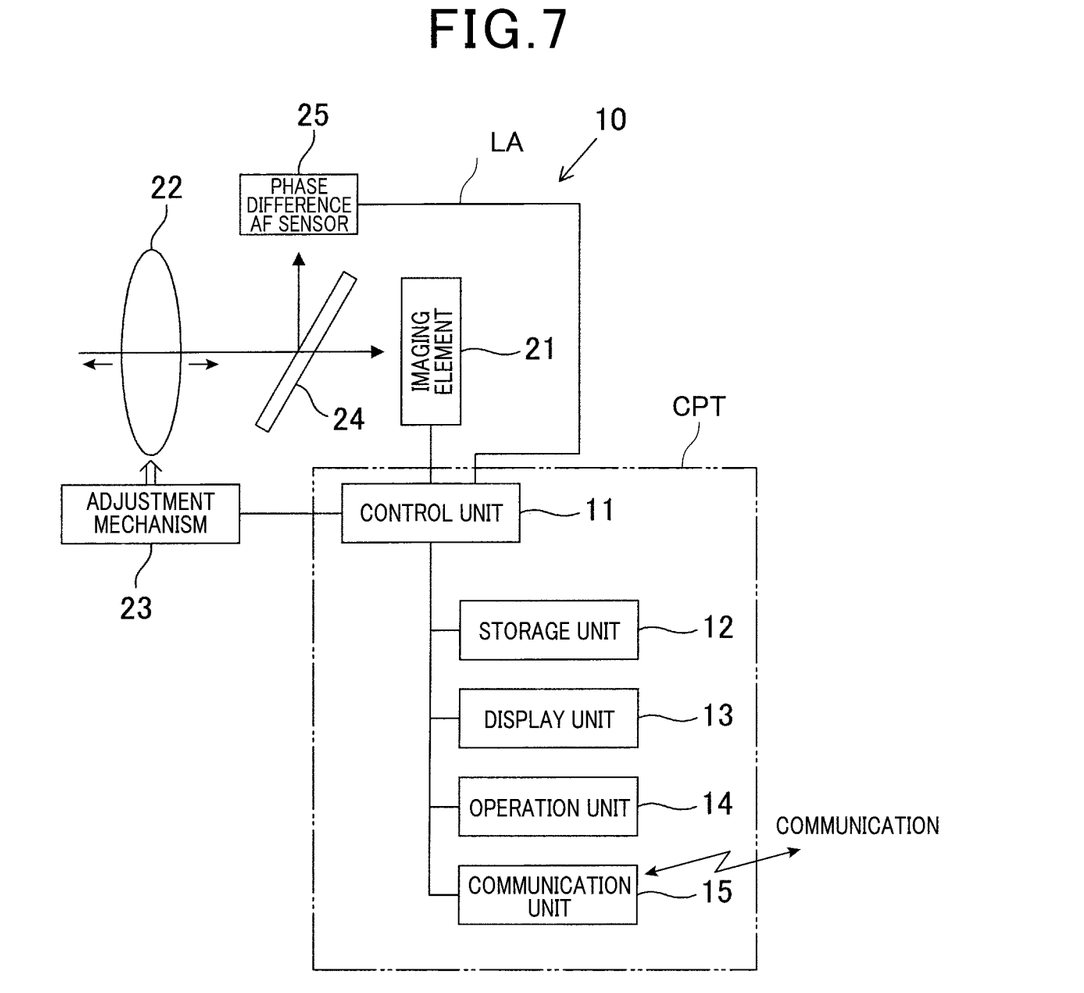
FIG. 7 is a block diagram of a schematic configuration of an imaging device according to a second embodiment.
Figure 8:
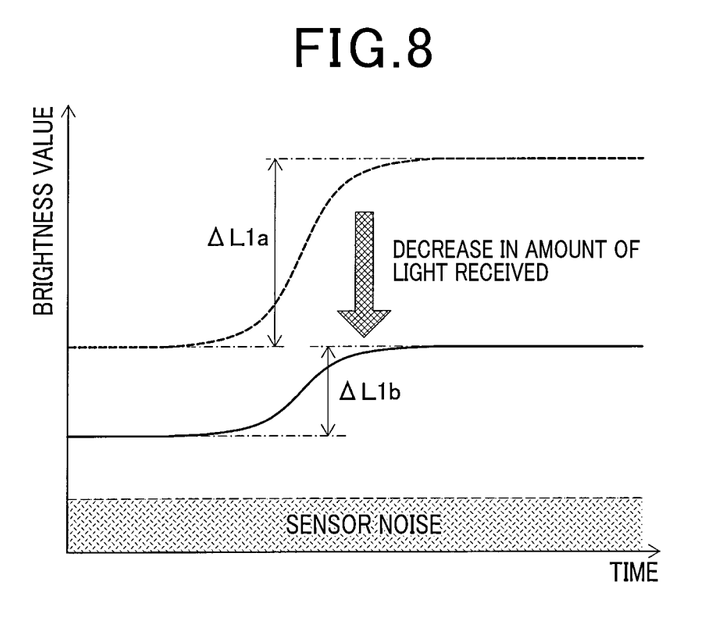
FIG. 8 is a view illustrating a comparison between a change in brightness when light is split by a half mirror and a change in brightness when light is not split by a half mirror.

With reference to FIGS. 7 and 8, a second embodiment of an imaging device of the present invention will now be described.

In the present embodiment and subsequent embodiments, the same or similar components as those of the imaging device according to the aforementioned first embodiment are denoted by the same reference signs, and the description thereof will be omitted or simplified.

An imaging device 10A according to the present embodiment is also a device that operates as an event camera, similarly to the imaging device 10. The imaging device 10 outputs event data including two-dimensional point data corresponding to pixels whose brightness has changed for specifying positions of the pixels, time, and polarity of the change in brightness. The imaging device 10 then plots the two-dimensional point data PD of a plurality of event data outputted in a predetermined period as points on a predetermined plane to generate image data of a target object.

As shown in FIG. 7, the imaging device 10A includes a control unit 11 such as CPU, a storage unit 12 such as a semiconductor memory, a display unit 13 whose display content is controlled by the control unit 11, an operation unit 14 for outputting an operation signal to the control unit 11 in response to an input operation, and a communication unit 15 that communicates with external devices.

The imaging device 10A further includes a phase difference AF sensor 25, and a half mirror 24 as well as an imaging unit which includes the imaging element 21, the light receiving lens 22, the adjustment mechanism 23 and the like. Of these elements, the imaging element 21, the light receiving lens 22, and the adjustment mechanism 23 have the same configuration as those in the above first embodiment.

The half mirror 24 is configured as a beam splitter that splits a beam of light traveling from the light receiving lens 22 toward the imaging element 21 based on a predetermined light attenuation ratio to thereby allow part of the beam of light to be directed to the phase difference AF sensor 25. Accordingly, in the present embodiment, the predetermined threshold in the imaging element 21 is set based on the predetermined light attenuation ratio by the half mirror 24.

Referring now to FIG. 8, the reason that the predetermined threshold in the imaging element 21 is set based on the predetermined light attenuation ratio by the half mirror 24 will be described below. FIG. 8 is a view illustrating a comparison between a change in brightness when light is split by the half mirror 24 and a change in brightness when light is not split by the half mirror 24.

The imaging element 21, which is configured to output event data corresponding to pixels having a change in brightness of a predetermined threshold or more, is not affected by sensor noise even if the received amount of light decreases due to the half mirror 24. However, a decrease in the amount of light received may cause a decrease in the degree of change in brightness, leading to a decrease in frequency with which the event data are outputted. For example, as shown in FIG. 8, assuming that a change in brightness when a beam of light is not split is detected as $\Delta L1a$, while a change in brightness, which decreases in proportion to the above predetermined light attenuation ratio due to light split is detected as $\Delta L1b$. In this case, while the change in brightness $\Delta L1a$ increases relative to the predetermined threshold, the change in brightness $\Delta L1b$ decreases due to split of light, and thus event data are not outputted.

Therefore, in the present embodiment, the predetermined threshold in the imaging element 21 is set based on the predetermined light attenuation ratio by the half mirror 24. Specifically, the threshold in the case where a beam of light is not split is multiplied by $\Delta L1b/\Delta L1a$ to set a decreased threshold. Accordingly, a decrease in frequency with which event data are outputted due to light split by the half mirror 24 can be prevented.

The phase difference AF sensor 25 is a known sensor that detects the amount of shift from the in-focus position of the light receiving lens 22 in a phase difference AF method when receiving light via the light receiving lens 22. The phase difference AF sensor 25 is configured to output a signal corresponding to the shift amount described above to the control unit 11 when receiving the light split by the half mirror 24. The phase difference AF sensor 25 can correspond to an example of a "shift amount detection unit" that detects the amount of shift from the in-focus position of the light receiving lens 22.

In the imaging device 10A having the above configuration, the focal point adjustment procedure is performed by the control unit 11, in which the adjustment mechanism 23 is driven and controlled to decrease the amount of shift from the in-focus position of the light receiving lens 22 detected by the phase difference AF sensor 25 to thereby adjust the focal point of the light receiving lens 22 toward the in-focus position.

As described above, in the imaging device 10A according to the present embodiment, the imaging element 21 is adopted that outputs event data including two-dimensional point data corresponding to pixels having a change in brightness of a predetermined threshold or more when receiving light via the light receiving lens 22 for specifying positions of the pixels. Further, the half mirror 24 splits a beam of light traveling from the light receiving lens 22 toward the imaging element 21, and the phase difference AF sensor 25, when receiving the light thus split, detects the amount of shift from the in-focus position of the light receiving lens 22 in a phase difference AF method when receiving light. The adjustment mechanism 23 is driven and controlled by the control unit 11 based on the detected shift amount so that the focal point of the light receiving lens 22 is adjusted toward the in-focus position.

Since the focal point can be adjusted by detecting the amount of shift from the in-focus position of the light receiving lens 22 by using the light split by the half mirror 24, an autofocus function can be performed without using brightness information. Hence, it is also possible to provide the autofocusing function to the imaging device provided with the event-based camera.

In particular, since the predetermined threshold is set based on the light attenuation ratio by the half mirror 24, it is possible to prevent a decrease in the amount of light received by the imaging element 21 due to the half mirror 24 and thus a decrease in the frequency with which event data are outputted.

Third Embodiment

With reference to FIGS. 9A, 9B, and 10A to 10D, an imaging device according to a third embodiment will be described.

The imaging device according to the third embodiment has the same configuration as that of the imaging device 10A of the aforementioned second embodiment.

The third embodiment differs from the second embodiment mainly in that the predetermined threshold is modified according to a shift amount detected by the phase difference AF sensor 25. The components which are substantially the same as those of the second embodiment are denoted by the same reference signs, and the description thereof will be omitted.

Figure 9A:
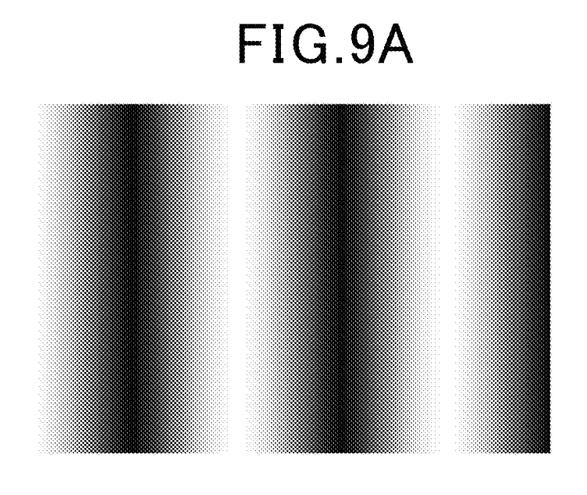
FIG. 9A is a view illustrating a target object for an imaging device according to a third embodiment.
Figure 9B:
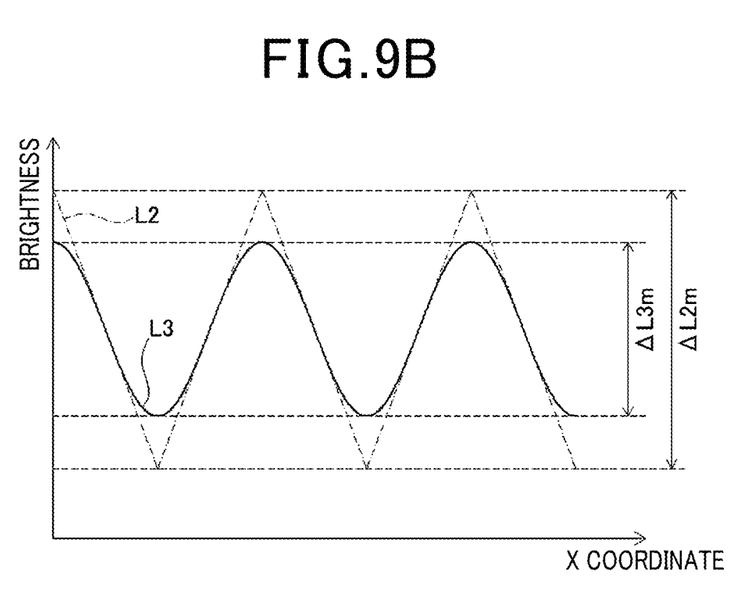
FIG. 9B is a view illustrating a positional change in brightness measured in an in-focus state and a positional change in brightness measured in an out-of-focus state when light from a target object of FIG. 9A is received.
Figure 10A:
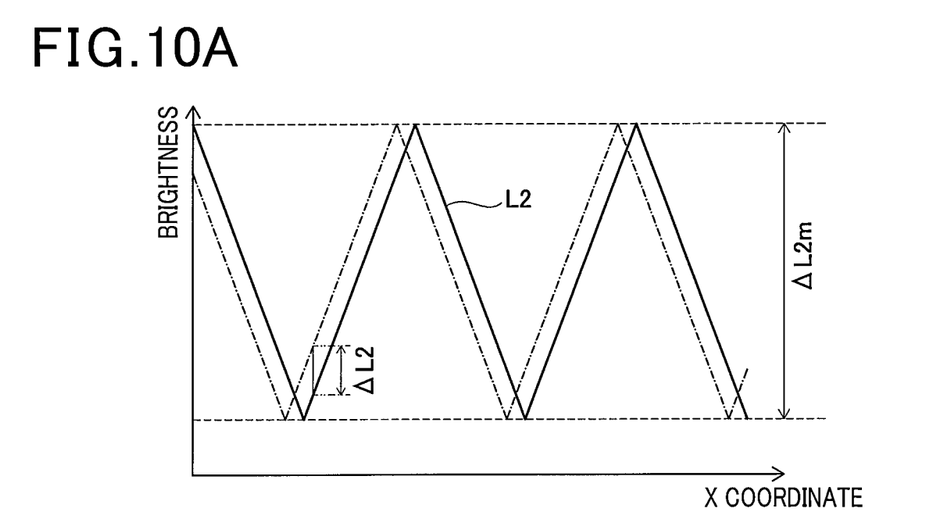
FIG. 10A is a view illustrating a positional change in brightness when a target object shown in FIG. 9A in an in-focus state moves to the right in the figure.
Figure 10B:
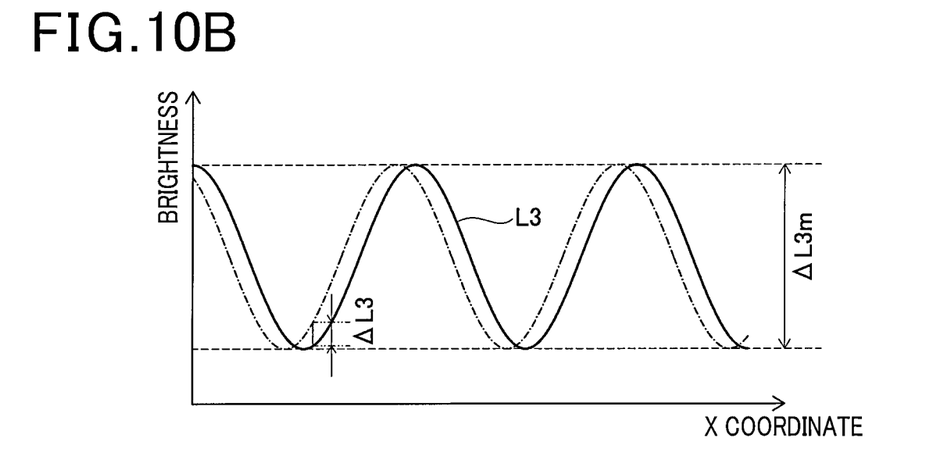
FIG. 10B is a view illustrating a positional change in brightness when a target object shown in FIG. 9A in an out-of-focus state moves to the right in the figure.
Figure 10C:
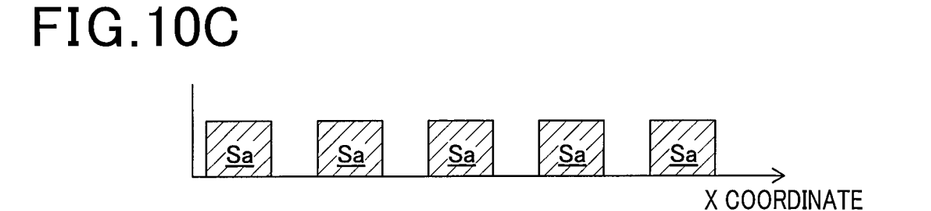
FIG. 10C is a view illustrating an event data output range in a light-receiving state shown in FIG. 10B before a threshold is modified.
Figure 10D:
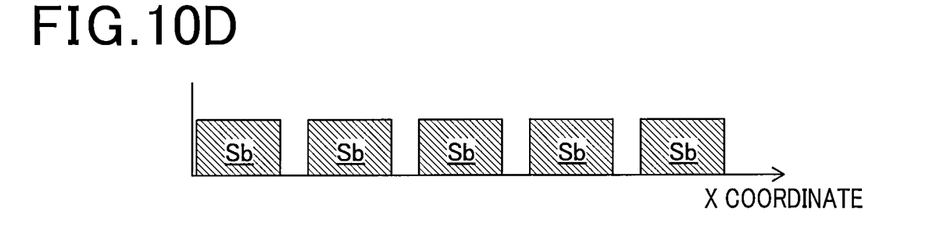
FIG. 10D is a view illustrating an event data output range in a light-receiving state shown in FIG. 10B after a threshold is modified.

FIG. 9A is a view illustrating a target object; and FIG. 9B is a view illustrating a positional change in brightness measured in an in-focus state and a positional change in brightness measured in an out-of-focus state when light from the target object of FIG. 9A is received. FIG. 10A is a view illustrating a positional change in brightness when the target object shown in FIG. 9A in an in-focus state moves to the right in the figure; FIG. 10B is a view illustrating a positional change in brightness when the target object shown in FIG. 9A in an out-of-focus state moves to the right in the figure; FIG. 10C is a view illustrating an event data output range in a light-receiving state shown in FIG. 10B before the threshold is modified; and FIG. 10D is a view illustrating an event data output range in a light-receiving state shown in FIG. 10B after the threshold is modified.

In the configuration using the above imaging element 21, if the target object is moving and difficult to be focused, the frequency with which the event data are outputted may continuously decrease. For example, as shown in FIG. 9A, assuming that the target object is a surface in which grayscale varies in a wavy pattern in one direction, and light from the surface is received. When such a target object is imaged in a stationary state, and light is received in an in-focus state (focal point is in focus), the brightness value changes as indicated by the brightness L2 in FIG. 9B, and a brightness range becomes wide (see reference numeral ΔL2$m$ in FIG. 9B). On the other hand, when light is received in an out-of-focus state (focal point is out of focus), the brightness value changes as indicated by the brightness L3 in FIG. 9B, and a brightness range becomes narrow compared with the brightness L2 (see reference numeral ΔL3$m$ in FIG. 9B) due to a larger blur.

Accordingly, when the target object shown in FIG. 9A in the in-focus state moves to the right in the figure, a change in brightness becomes relatively large as shown in FIG. 10A. On the other hand, when the target object in the out-of-focus state moves to the right in the figure, a change in brightness becomes relatively small as shown in FIG. 10B. For example, at the vicinity of the minimum brightness value, a change in brightness in the out-of-focus state (see reference numeral ΔL3 in FIG. 10B) is smaller than a change in brightness in the in-focus state (see reference numeral ΔL2 in FIG. 10A).

Thus, when the target object moves, a change in brightness is smaller in the out-of-focus state than in the in-focus state, and the frequency with which event data are outputted also decreases. For example, in the light-receiving state shown in FIG. 10B, a change in brightness is significantly small at the vicinity of the maximum brightness value and at the vicinity of the minimum brightness value. In this case, as seen from an event data output range Sa shown in FIG. 10C, event data are not outputted at the vicinity of the maximum brightness value and at the vicinity of the minimum brightness value before a threshold modification is performed.

Therefore, in the present embodiment, the control unit 11 (see FIG. 7) performs a threshold control to the imaging element 21 so that the predetermined threshold for outputting the event data is modified according to a shift amount detected by the phase difference AF sensor 25. Specifically, for example, when the detected shift amount is larger than or equal to the predetermined value, the control unit 11 performs a threshold control to decrease the predetermined threshold by a specific amount. The control unit 11 that performs the threshold control to the imaging element 21 can correspond to an example of a "threshold changing unit."

Accordingly, for example, even in the light-receiving state in FIG. 10B, as seen from an event data output range Sb shown in FIG. 10D, the output range after the threshold modification becomes wider than the event data output range Sa before the threshold modification shown in FIG. 10C. Thus, the frequency with which event data are outputted can be increased. That is, the predetermined threshold can be lowered when the shift amount increases. Accordingly, even if the target object is continuously out of focus, the frequency with which event data are outputted can be prevented from decreasing.

On the other hand, when the detected shift amount is smaller than or equal to a predetermined value, that is, when the target object is substantially in focus, the predetermined threshold can be increased to prevent excessive event data from being outputted.

The present invention is not limited to the aforementioned embodiments, and may be embodied as described below, for example.

(1) In the second embodiment, the predetermined threshold as a reference for outputting event data in the imaging element 21 may be altered so that the threshold is lowered to a greater degree with an increase in the detected shift amount.

(2) The amount of shift from the in-focus position of the light receiving lens 22 can be detected not only by the phase difference AF sensor 25, but also by a shift amount detection unit that uses other detection methods.

PARTIAL REFERENCE SIGNS LIST

10 . . . Imaging device
11 . . . Control unit (point density calculation unit)
21 . . . Imaging element
22 . . . Light receiving lens
23 . . . Adjustment mechanism
24 . . . Half mirror (beam splitter)
25 . . . Phase difference AF sensor (shift amount detection unit)

What is claimed is:

1. An imaging device comprising:
a light receiving lens through which light coming from a target object is received;
an imaging element that outputs event data including two-dimensional point data corresponding to pixels having a change in brightness of a predetermined threshold or more than the predetermined threshold when the light is received via the light receiving lens, the two-dimensional point data having specified positions of the pixels in a plane representing an area imaged by the imaging element;
an adjustment mechanism configured to adjust a focal point of the light receiving lens;
a control unit configured to drive the adjustment mechanism and control the focal point of the light receiving lens;
a beam splitter arranged in a light path from the light receiving lens and the imaging element and configured to split a beam of the light traveling from the light receiving lens toward the imaging element such that the light is split in two ways including one way to the imaging element; and
a phase difference autofocus sensor configured to receive the light split by the beam splitter, and detect a shift amount from an in-focus position of the light receiving lens by implementing a phase difference autofocus method, wherein the target object is moving so that a brightness change becomes smaller in accordance with the shift amount from the focal point, the control unit is configured to drive and control the adjustment mechanism to adjust the focal point toward the in-focus position based on the shift amount detected by the phase difference autofocus sensor, and the control unit is configured to decrease the predetermined threshold when the shift amount detected by the phase difference autofocus sensor is larger than or equal to a predetermined value so that a decrease in an output of the event data of the imaging element is effectively prevented even if the target object is continuously out of focus, and to increase the predetermined threshold when the shift amount detected by the phase difference autofocus sensor is smaller than the predetermined value so that excessive event data outputting is effectively prevented when the target object is substantially in focus.

2. The imaging device according to claim 1, wherein the predetermined threshold is set based on a light attenuation ratio by the beam splitter.

3. The imaging device according to claim 1, further comprising a threshold changing unit configured to change the predetermined threshold according to the shift amount detected by the phase difference autofocus sensor.

* * * * *